United States Patent
Akita et al.

(10) Patent No.: US 7,359,627 B2
(45) Date of Patent: Apr. 15, 2008

(54) DVD PLAYER AND DVD PLAYING METHOD

(75) Inventors: Koji Akita, Iwaki (JP); Hideki Ito, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1157 days.

(21) Appl. No.: 10/122,872

(22) Filed: Apr. 15, 2002

(65) Prior Publication Data

US 2003/0194212 A1 Oct. 16, 2003

(51) Int. Cl.
  H04N 5/00 (2006.01)
  H04N 5/91 (2006.01)
  H04N 7/00 (2006.01)
(52) U.S. Cl. .................. 386/126; 386/95; 386/125
(58) Field of Classification Search .................. 386/94, 386/95, 125, 111, 126
  See application file for complete search history.

(56) References Cited

U.S. PATENT DOCUMENTS

| 5,995,744 | A | * | 11/1999 | Guccione | ..................... | 703/23 |
| 5,999,698 | A | * | 12/1999 | Nakai et al. | ................. | 386/125 |
| 6,064,385 | A | | 5/2000 | Sturgeon et al. | | |
| 6,215,952 | B1 | * | 4/2001 | Yoshio et al. | .................. | 386/94 |
| 6,285,826 | B1 | | 9/2001 | Murase et al. | | |
| 6,553,180 | B1 | * | 4/2003 | Kikuchi et al. | ............... | 386/95 |

FOREIGN PATENT DOCUMENTS

| JP | 11-041563 | 2/1999 |
| JP | 11-238367 | 8/1999 |
| JP | 2000-348467 | 12/2000 |

* cited by examiner

Primary Examiner—Thai Q. Tran
Assistant Examiner—Hung Dang
(74) Attorney, Agent, or Firm—Brinks Hofer Gilson & Lione

(57) ABSTRACT

A DVD player performs processing which, when subpicture settings, audio settings, or angle settings cannot be changed, determines whether the switching operation is impossible due to a lack of data recorded on a DVD, or is prohibited by a title producer or due to player specifications. When a user-designated operation cannot be executed, the DVD player displays a message indicating that the operation is prohibited by the title producer or due to the player specifications. When the operation is impossible due to a lack of data corresponding to the operation, the DVD player displays a message indicating that the operation is impossible due to the lack of the corresponding data.

8 Claims, 12 Drawing Sheets

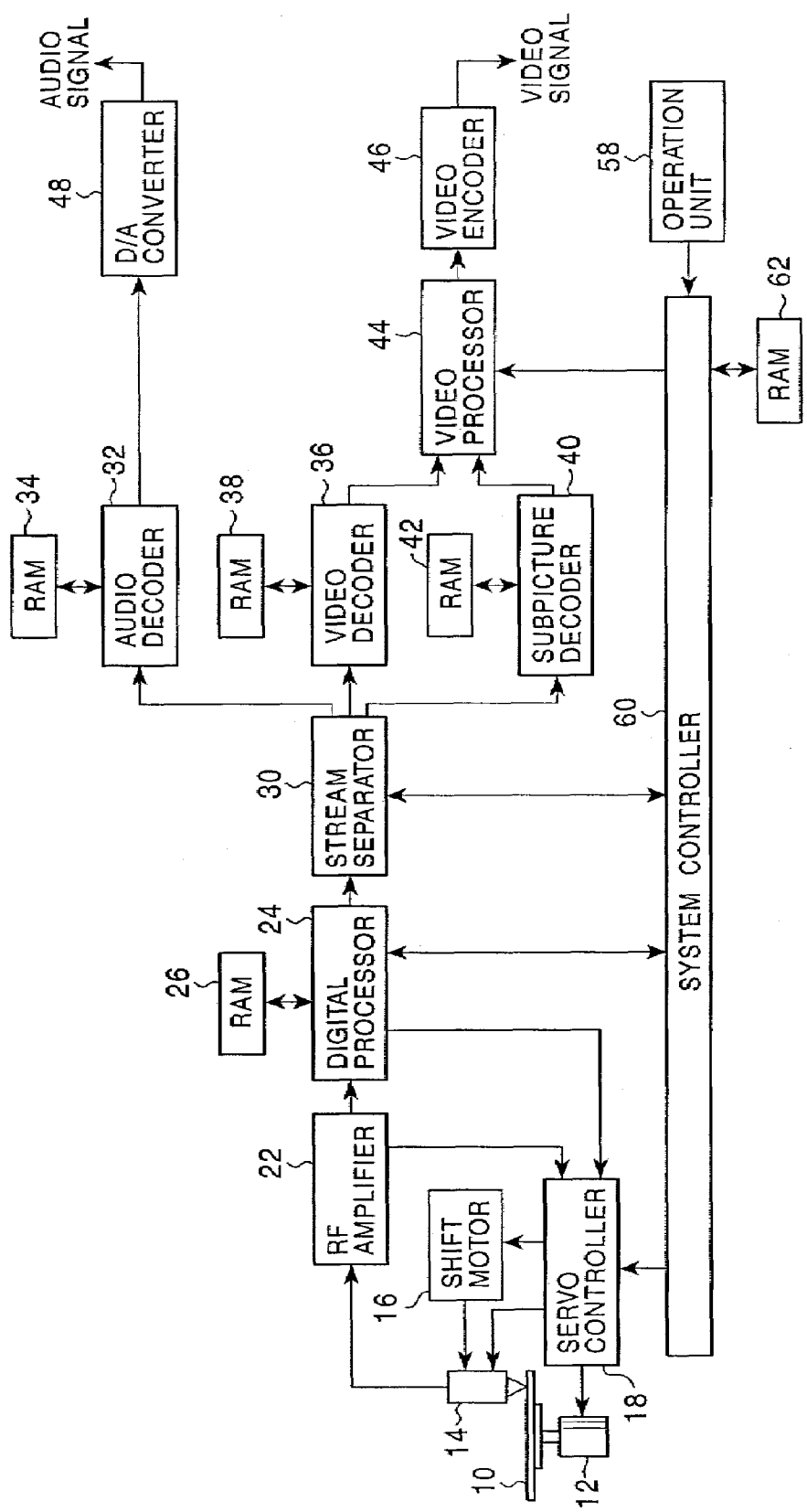

FIG. 5

PGCI

PROGRAM-CHAIN
GENERAL INFORMATION
(PGC_GI)

PROGRAM-CHAIN
COMMAND TABLE
(PGC_CMDT)

PROGRAM-CHAIN
PROGRAM MAP
(PGC_PGMAP)

CELL-PRESENTATION
INFORMATION TABLE
(C_PBIT)

CELL-POSITION
INFORMATION TABLE
(C_POSIT)

FIG. 6

PGC_GI

| PGC_CNT | PGC CONTENT |
|---|---|
| PGC_PB_TM | PGC PLAYBACK TIME |
| PGC_UOP_CTL | PGC USER'S OPERATION CONTROL INFORMATION |
| PGC_AST_CTLT | PGC AUDIO-STREAM CONTROL TABLE |
| PGC_SPST_CTLT | PGC SUBPICTURE-STREAM CONTROL TABLE |
| PGC_NV_CTL | PGC NAVIGATION CONTROL INFORMATION |
| PGC_SP_PLT | PGC SUBPICTURE PALETTE |
| PGC_CMDT_SA | PGC-CMDT START ADDRESS |
| PGC_PGMAP_SA | PGC-PGMAP START ADDRESS |
| C_PBIT_SA | C_PBIT START ADDRESS |
| C_POSIT_SA | C_POSIT START ADDRESS |

FIG. 7

PCI

| PCI_GI | PCI GENERAL INFORMATION |
|---|---|
| NSML_AGLI | NONSEAMLESS ANGLE INFORMATION |
| HLI | HIGHLIGHT INFORMATION |
| RECI | RECORDING INFORMATION |

FIG. 8

PCI_GI

| NV_PCK_LBN | NAVIGATION-PACK LBN |
|---|---|
| VOBU_CAT | VOBU CATEGORY |
| VOBU_UOP_CTL | VOBU USER'S-OPERATION INFORMATION |
| VOBU_S_PTM | VOBU PRESENTATION-START TIME |
| VOBU_E_PTM | VOBU PRESENTATION-END TIME |
| VOBU_SE_E_PTM | IN-VOBU SEQUENCE-END PRESENTATION-END TIME |
| C_ELTM | IN-CELL ELAPSE TIME |

DVD PLAYER AND DVD PLAYING METHOD

BACKGROUND OF THE INVENTION

1. Field of the Invention

The present invention relates to a digital versatile disk (DVD) player for playing back content such as a movie which is recorded on a DVD.

2. Description of the Related Art

Recently, DVD players have quickly come into widespread use, and as a result, movies, etc., can be enjoyed even at home with high picture quality and high sound quality. The DVD specification enables recording of a maximum of eight languages for audio, a maximum of thirty-two languages for subpictures used as subtitles, and a maximum of nine angles. When a plurality of languages for audio, a plurality of languages for subpictures, and a plurality of angles are recorded on a DVD (hereinafter, DVD means a disk produced in conformity with the DVD specification), a user can enjoy a video by selecting an audio language, a subpicture language, and an angle which match the user's preferences.

With a DVD player, in order to enjoy a movie to the utmost, the user can set the audio language to English and the subpicture language to Japanese, or alternatively can erase the subpictures while setting the audio language to English. However, these functions cannot be used if the content recorded on the DVD is not so designed. DVDs which are available on the market include a type in which a subtitled video is recorded without separately recording video and subpictures. For example, this type includes one in which an old film of a foreign movie is converted into DVD format without being changed, and one in which videocassette is converted to DVD format without being changed.

When the video recorded on this type of DVD is played back by a DVD player, subpictures are superimposed on the video on the screen, and it looks as if subpictures have been selected. With this DVD, since the user cannot erase the subpictures when playing back the video, the user become aware that the subpictures cannot be switched, even though they appear to be selected. In this case, the user cannot determine whether this is due to the DVD or the DVD player.

In addition, there may be a case in which a DVD producer prohibits the audio language, the subpicture language, or the angle from being switched. For example, when the subpictures are prohibited from being switched, the user cannot erase the subpictures even though the video (main picture) and the subpictures are separately recorded. Also in this case, the user cannot determine whether this inability to switch the subpictures is due to the DVD or the DVD player.

Therefore, according to the conventional player of the related art, when the user cannot switch the audio language settings and the subpicture language settings, the user may mistakenly think that the DVD player (e.g., the player itself or a remote controller therefor) is out of order although the cause is the content recorded on the DVD.

SUMMARY OF THE INVENTION

It is an object of the present invention to provide a DVD player in which, when subpicture, audio, or angle settings cannot be switched, the DVD player determines that switching the settings is impossible due to the fact that there is a lack of data recorded on a DVD or the fact that switching the settings is prohibited by a title producer or due to the specifications of the player.

To this end, according to an aspect of the present invention, a digital versatile disk player for playing back content recorded on a digital versatile disk is provided. The digital versatile disk player includes a controller in which, in a case where a user-designated operation cannot be executed, such as when the operation is prohibited by a title producer or due to player specifications, the controller displays, on a display unit for the digital versatile disk player, a message indicating that the operation is prohibited by the title producer or due to the player specifications. When the operation is impossible due to a lack of data corresponding to the operation, the controller displays, on the display unit, a message indicating that the operation is impossible due to the lack of the corresponding data.

According to another aspect of the present invention, a digital versatile disk player for playing back content recorded on a digital versatile disk is provided. The digital versatile disk player includes a controller which determines whether or not predetermined data for enabling a switching operation by a user is recorded on the digital versatile disk when power is supplied to the digital versatile disk player, or when the digital versatile disk is loaded into the digital versatile disk player, and when the data is not recorded, the controller displays, on a display unit for the digital versatile disk player, a message indicating that the data is not recorded.

According to another aspect of the present invention, a digital versatile disk player for playing back content recorded on a digital versatile disk is provided. The digital versatile disk player includes a controller which determines whether or not predetermined data for enabling a switching operation by a user is recorded on the digital versatile disk when the digital versatile disk is played back, and displays, on a display unit for the digital versatile disk player, one of a type of operation which is executable by a user and a type of operation which is not executable by the user.

According to another aspect of the present invention, a digital versatile disk player for playing back content recorded on a digital versatile disk is provided. The digital versatile disk player includes a key for displaying a type of operation which is executable by a user and a type of operation which is not executable by the user, and a controller for simultaneously displaying both the executable type of operation and the non-executable type of operation after, when a user uses the key to perform an operation, determining whether or not predetermined data for enabling a switching operation by the user is recorded on the digital versatile disk.

According to another aspect of the present invention, a digital-versatile-disk playback method for playing back content recorded on a digital versatile disk is provided. The digital-versatile-disk playback method includes the steps of, in a case where a user-designated operation cannot be executed, such as when the operation is prohibited by a title producer or due to the player specifications, displaying a message indicating that the operation is prohibited by the title producer or due to the player specifications. When the operation is impossible due to a lack of data corresponding to the operation, displaying a message indicating that the operation is impossible due to the lack of the corresponding data.

According to another aspect of the present invention, a digital-versatile-disk playback method for playing back content recorded on a digital versatile disk is provided. The digital-versatile-disk playback method includes the steps of, when power is supplied, or when the digital versatile disk is loaded, determining whether or not predetermined data for enabling a switching operation by a user is recorded on the digital versatile disk, and displaying a message indicating that the data is not recorded when the data is not recorded.

According to another aspect of the present invention, a digital-versatile-disk playback method for playing back content recorded on a digital versatile disk is provided. The digital-versatile-disk playback method includes the steps of, when the digital versatile disk is played back, determining whether or not predetermined data for enabling a switching operation by a user is recorded on the digital versatile disk, and displaying one of a type of operation which is executable by a user and a type of operation which is not executable by the user.

According to another aspect of the present invention, a digital-versatile-disk playback method for playing back content recorded on a digital versatile disk is provided. The digital-versatile-disk playback method includes the steps of, when the digital versatile disk is played back, determining whether or not predetermined data for enabling a switching operation by a user is recorded on the digital versatile disk, and simultaneously displaying both a type of operation which is executable by a user and a type of operation which is not executable by the user.

According to another aspect of the present invention, a digital-versatile-disk playback method for playing back content recorded on a digital versatile disk is provided. The digital-versatile-disk playback method includes the steps of, when a predetermined key for displaying a type of operation which is executable by a user and a type of operation which is not executable by the user is operated by the user, determining whether or not predetermined data for enabling a switching operation by the user is recorded on the digital versatile disk, and simultaneously displaying both the executable type of operation and the non-executable type of operation.

According to the present invention, when a user cannot switch settings in a DVD player, the DVD player shows what prohibits the settings from being switched. This prevents the user from having an anxiety that the DVD player is out of order.

According to the present invention, when predetermined data for enabling a switching operation is not recorded on a DVD, a message indicating a lack of the data is displayed. This enables the user to know that the operation is impossible due to the lack of data. This also prevents the user from having an anxiety that the DVD player is out of order even though the operation is impossible due to the DVD.

According to the present invention, a type of operation which is executable by the user and a type of operation which is not executable by the user are displayed. This enables the user to know that a setting switching operation is impossible due to a lack of data. This also prevents the user from having an anxiety that the DVD player is out of order even though the operation is impossible due to the DVD.

BRIEF DESCRIPTION OF THE DRAWINGS

FIG. 1 is a block diagram showing a DVD player according to a first embodiment of the present invention;

FIG. 5 is a schematic illustration of the data configuration of program-chain information (PGCI);

FIG. 6 is a schematic illustration of the data configuration of program-chain general information (PGC_GI);

FIG. 7 is a schematic illustration of the data configuration of presentation control information (PCI);

FIG. 8 is a schematic illustration of the data configuration of PCI general information (PCI-GI);

DESCRIPTION OF THE PREFERRED EMBODIMENTS

Figure 2A:
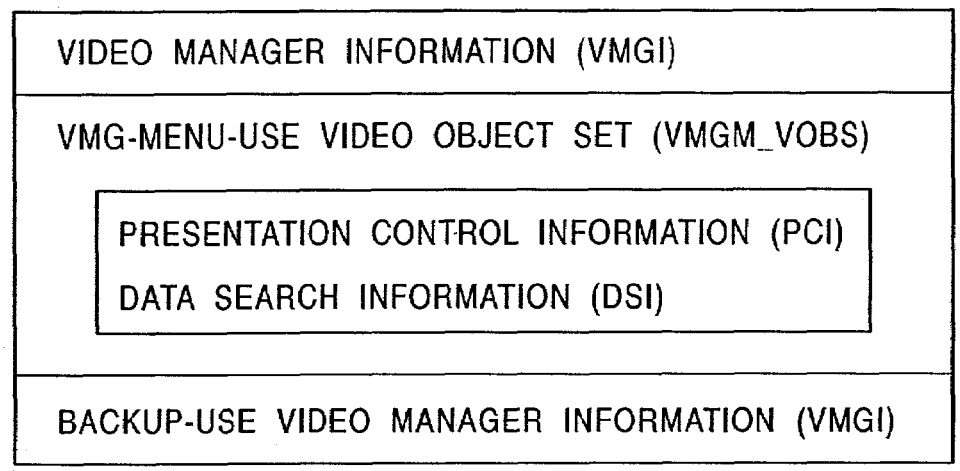
FIG. 2A is a schematic illustration of the data configuration of a video manager (VMG)

Embodiments of the present invention are described below with reference to the accompanying drawings.

First Embodiment

FIG. 1 is a block diagram showing a DVD player according to a first embodiment of the present invention.

A DVD disk 10 is loaded into the DVD player. The DVD player includes a spindle motor 12 for rotating the disk 10, an optical pickup 14 which reads data recorded on the disk 10 by emitting a laser beam onto the disk 10 and receiving reflected light from the disk 10, a shift motor 16 for moving radially over the disk 10 a sled (not shown) on which the optical pickup 14 is mounted, and a servo controller 18 which performs driving control of the shift motor 16, tracking control and focus control of the optical pickup 14, and rotational control of the spindle motor 12.

The DVD player includes a radio frequency (RF) amplifier 22 which amplifies an RF signal output from the optical pickup 14 and transmits the amplified signal to the next stage. The RF amplifier 22 also separates control signals for focus searching, tracking, etc., from the RF signal, and sends the control signals to the servo controller 18. The DVD player includes a digital signal processor 24 which separates a control signal by performing digital signal processing on the amplified RF signal from the RF amplifier 22. The separated control signal is sent to the servo controller 18 and a system controller 60 (described later). The DVD player includes a random access memory (RAM) 26 in which data is temporarily stored in connection with signal processing by the digital signal processor 24.

A stream separator 30 separates the other signals output from the digital signal processor 24 into an audio bit stream, a main-picture bit stream, and a sub-picture bit stream.

An audio decoder 32 produces a digital audio signal by decoding the audio bit stream from the stream separator 30. A RAM 34 temporarily stores data in connection with decoding performed by the audio decoder 32. The audio decoder 32 performs decoding processes in accordance with audio signal types such as linear PCM, AC-3, and MPEG audio.

A digital-to-analog (D/A) converter 48 converts the digital audio signal from the audio decoder 32 into an analog audio signal. The analog audio signal is sent from the D/A converter 48 to a speaker (not shown) via an amplifier (not shown).

A video decoder 36 performs decoding processing on the main-picture stream from the stream separator 30. A RAM 38 temporarily stores decoding processing on the main-picture stream in connection with the decoding processing by the video decoder 36. A sub-picture decoder 40 performs decoding processing on the sub-picture stream from the stream separator 30. A RAM 42 temporarily stores data in connection with the decoding processing by the sub-picture decoder 40.

The main-picture stream is a signal compressed in accordance with the format of MPEG-2. The sub-picture stream is a signal compressed in accordance with run-length coding.

A video processor 44 digitally combines a main picture provided from the video decoder 36 and a sub-picture provided from the sub-picture decoder 40. A video encoder 46 converts a digital video signal provided from the video processor 44 into an analog video signal. The video signal is sent from the video encoder 46 to a display unit (not shown) such as a cathode-ray tube or a liquid crystal display panel, so that a picture is displayed on the display unit.

The DVD player also includes a system controller 60 and an operation unit 58 provided with various operation buttons, etc. Based on a signal from the operation unit 58, a signal from the digital signal processor 24, and a signal from the stream separator 30, the system controller 60 controls the servo controller 18, the digital signal processor 24, the stream separator 30, and the video processor 44. A RAM 62 temporarily stores data in connection with control operations by the system controller 60.

DVDs employ two file systems, the Universal Disk Format (UDF) and ISO 9660. In each of the file systems, all files on a DVD can be accessed. In other words, content recorded on the DVD can be read, whichever file system is used.

On the DVD disk, one video manager (VMG) and at least one video title set (VTS) are recorded. As FIG. 2 shows, a video manager consists of video-manager information (VMGI) at the beginning, a VMG-menu-use video object set (VMGM_VOBS), and backup-use video manager information (VMGI) at the end. The video manager information is control information concerning the entirety of the DVD video. The VMG-menu-use video object set is the content for a title-selection menu.

A video title set consists of video-title-set information (VTSI) at the beginning, a VTS-menu-use video object set (VTSM_VOBS), a VTS-title-use video object set (VTSTT_VOBS), and backup-use video-title-set information (VTSI) at the end. The video-title-set information is control information for the video title set. The VTS-menu-use video object set is the content for various menus in the video title set. The VTS-title-use video object set is the content for playing back a title.

Figure 2B:
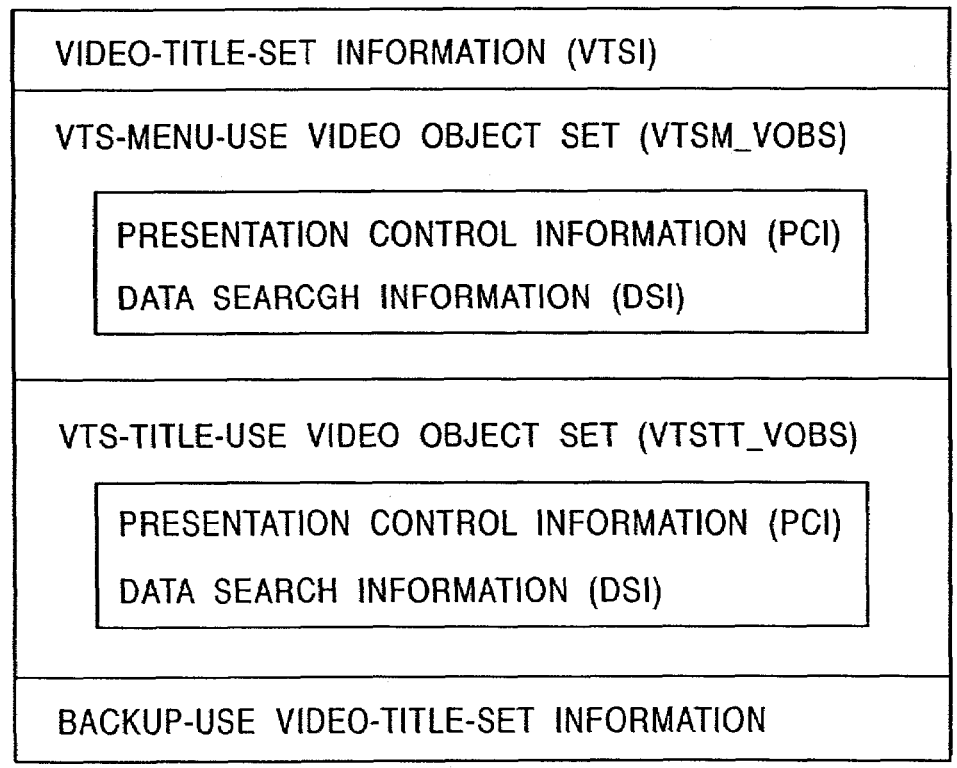
FIG. 2B is a schematic illustration of the data configuration of a video title set (VTS)

The video-manager information, the video-title-set information, presentation control information (PCI), and data search information (DSI) are called "navigation data". The navigation data relates to the attribute of data (presentation data) such as pictures and audio and to playback control. As each of FIGS. 2A and 2B shows, the presentation control information and the data search information are disposed in the video object set together with the presentation data.

Figure 3:
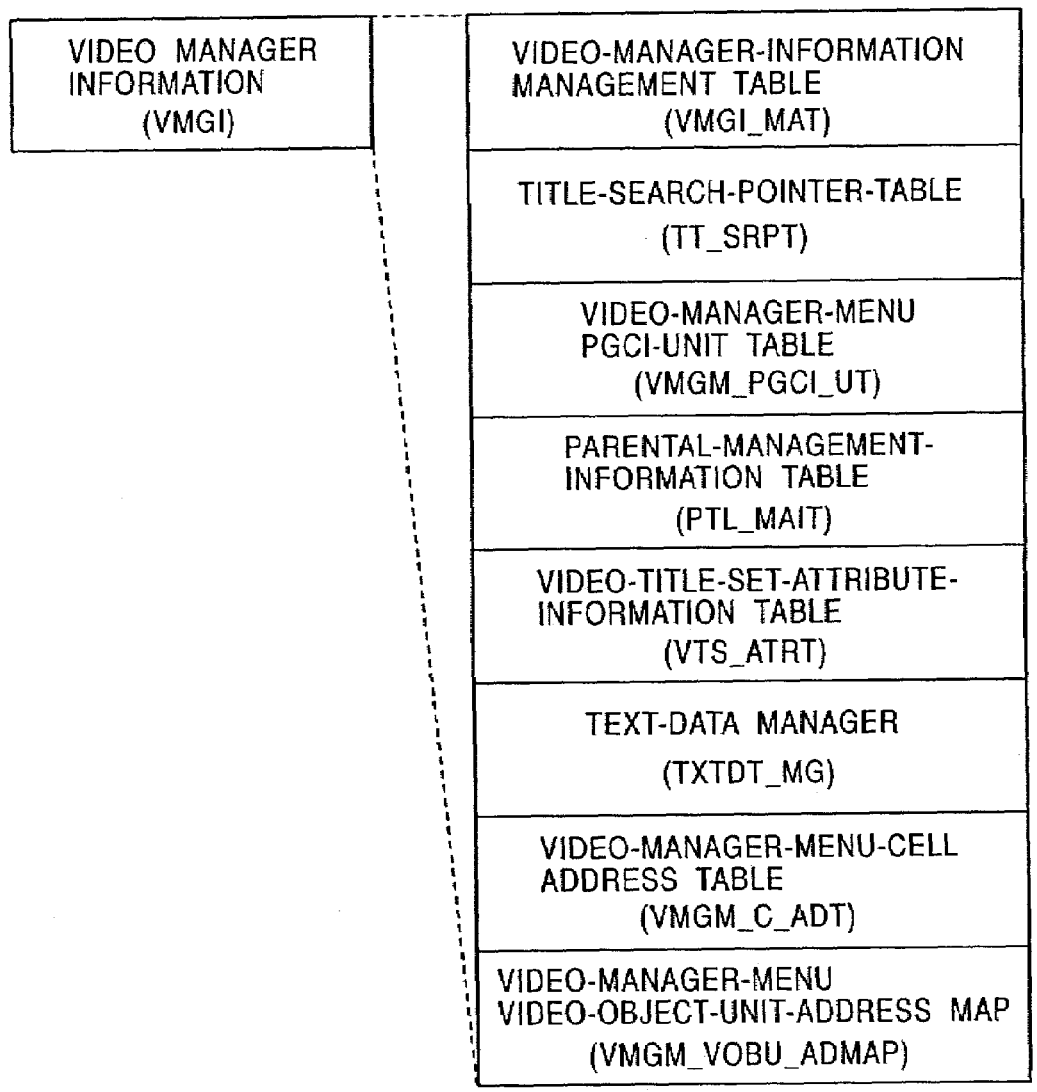
FIG. 3 is a schematic illustration of the data configuration of video manager information (VMGI)

As FIG. 3 shows, the video manager information consists of a video-manager-information management table (VMGI_MAT), a title-search-pointer table (TT_SRPT), a video-manager-menu PGCI-unit table (VMGM_PGCI_UT), a parental-management-information table (PTL_MAIT), a video-title-set-attribute-information table (VTS_ATRT), a text-data manager (TXTDT_MG), a video-manager-menu-cell-address table (VMGM_C_ADT), and a video-manager-menu video-object-unit-address map (VMGM_VOBU_ADMAP).

Among these tables, the title-search-pointer table contains a title playback type (TT_PB_TY), the number of angles (AGL_Ns), the number of parts of title (PTT_Ns), a title-use parental ID field (TT_PTL_ID_FLD), a VTS number (VTSN), a VTS title number (VTS_TTN), and the start address (VTS_SA) of the VTS.

Figure 4:
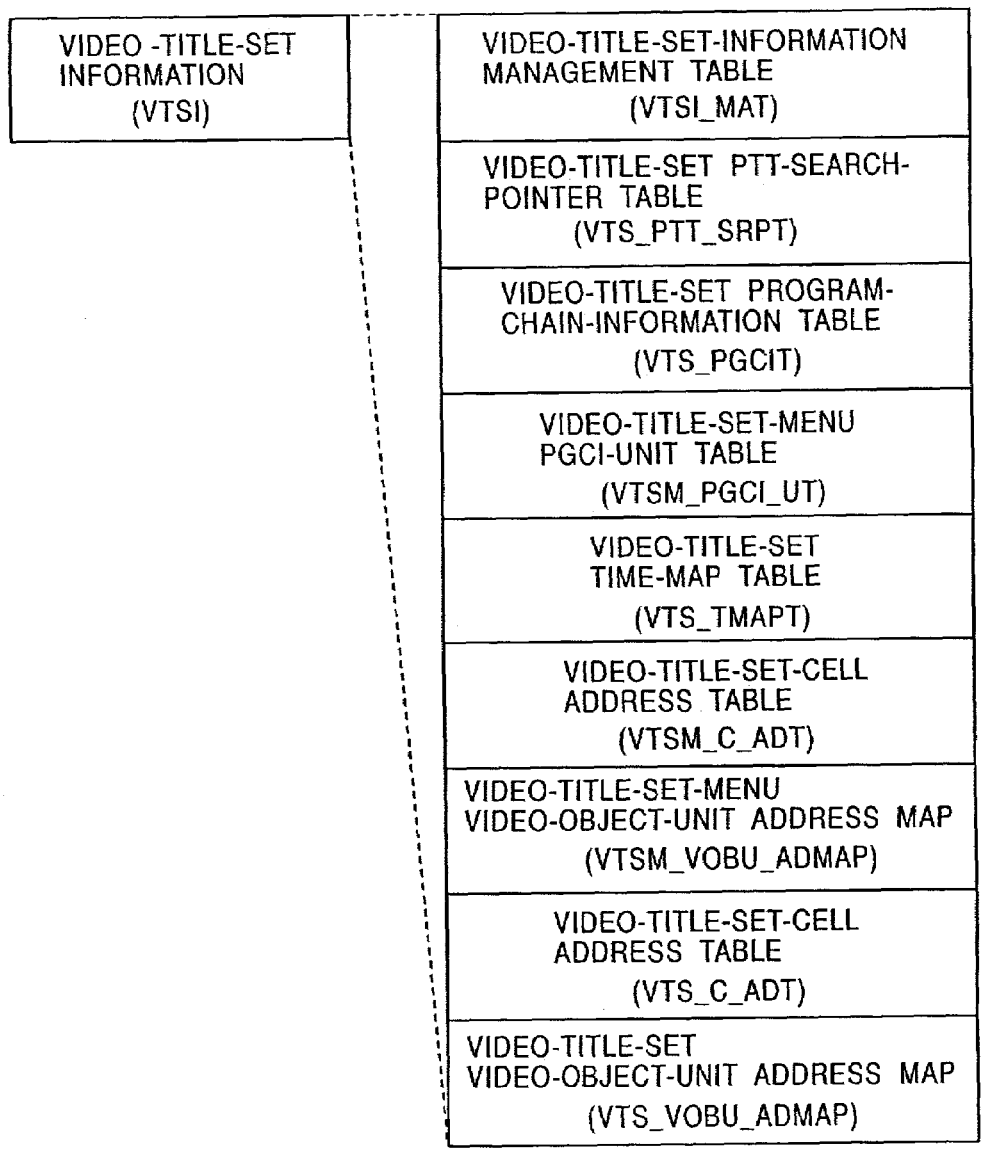
FIG. 4 is a schematic illustration of the data configuration of video-title-set information (VTSI)

As FIG. 4 shows, the video-title-set information consists of a video-title-set-information management table (VTSI_MAT), a video-title-set PTT-search-pointer table (VTS_PTT_SRPT), a video-title-set program-chain-information table (VTS_PGCIT), a video-title-set-menu PGCI-unit table (VTSM_PGCI_UT), a video-title-set time-map table (VTS_TMAPT), a video-title-set-cell address table (VTSM_C_ADT), a video-title-set video-object-unit address map (VTSM_VOBU_ADMAP), a video-title-set-cell address table (VTS_C_ADT), and a video-title-set-video-object-unit address map (VTS_VOBU_ADMAP).

Among these, the video-title-set-information management table contains the number of audio streams (VTSM_AST_Ns) of the video title set menu, the number of sub-picture streams (VTSM_SPST_Ns) of the video-title-set menu, and the number of sub-picture streams (VTS_SPST_Ns) of the video-title set.

The program chain information is described in the video manager information and the video-title-set information. The program chain information is navigation data for controlling the presentation of a program chain (PGC).

As FIG. 5 shows, the program chain information consists of program-chain general information (PGC_GI), a program-chain command table (PGC_CMDT), a program-chain program map (PGC_PGMAP), a cell-presentation information table (C_PBIT), and a cell-position information table (C_POSIT).

As FIG. 6 shows, the program-chain general information consists of a program-chain content (PCG_CNT), a program-chain playback time (PGC_PB_TM), PGC user's-operation control information (PGC_UOP_CTL), a PGC audio-stream control table (PGC_AST_CTLT), a PGC sub-picture-stream control table (PGC_SPST_CTLT), a PGC navigation-control information (PGC_NV_CTL), a PGC subpicture palette (PGC_SP_PLT), a PGC_CMDT start address (PGC_CMDT_SA), a PGC_PGMAP start address (PGC_PGMAP_SA), a C_PBIT start address (C_PBIT_SA), and a C_POSIT start address (C_POSIT_SA).

Among these, the PGC user's operation-control information contains user's operations which are prohibited during the presentation of the program chain. Specifically, the PGC user's-operation control information is 4-byte (32-bit) data in which its bits are assigned to user's operations such as subpicture switching, audio switching, and angle switching, excluding bits in reserve. When the value of each bit is "0", the user's operation is permitted. When the value of each bit is "1", the user's operation is prohibited.

Accordingly, by referring to the value of the bit corresponding to an operation type represented by the PGC user's-operation control information, it can be determined whether or not switching subpictures and audio is prohibited by the producer. However, in the case of the angle switching, when the corresponding bit of the PGC user's-operation control information is "1", and a block being created is an angle block, it is determined that angle switching is prohibited.

The PGC audio-stream control table is audio-stream-related data from zero to seven. Two bytes are assigned to each audio stream. The first bit of each audio stream is a validity flag. The validity flag represents validity in the program chain when being "1", while it represents invalidity when being "0". Accordingly, by referring to the PGC audio-stream control table, the number of usable audio streams in the program chain can be known.

The program-chain subpicture-stream control table is subpicture-related data from zero to thirty-one. Four bytes are assigned to each subpicture stream. The first bit of each subpicture is a validity flag. The validity flag represents validity in the program chain when being "1", while it represents invalidity in the program chain when being "0". Accordingly, by referring to the program-chain subpicture-stream control table, the number of subpictures in the program chain can be known.

The presentation control information is navigation data for controlling presentation of a video object unit (VOBU). As FIG. 7 shows, the presentation control information consists of PCI general information (PCI_GI), nonseamless angle information (NSML_AGLI), highlight information (HLI), and recording information (RECI).

As FIG. 8 shows, the PCI general information consists of navigation-pack LBN (NV_PCK_LBN), a VOBU category (VOBU_CAT), VOBU user's-operation control information (VOBU_UOP_CTL), a VOBU presentation-start time (VOBU_S_PTM), a VOBU presentation-end time (VOBU_E_PTM), an in-VOBU sequence-end presentation-end time (VOBU_SE_E_PTM), and an in-cell elapse time (C_ELTM).

The VOBU user's-operation control information contains user's operations which are prohibited during the presentation of a video object unit including the corresponding presentation control information. Specifically, the VOBU user's-operation control information is 4-byte (32-bit) data in which its bits are assigned to user's operations such as subpicture switching, audio switching, and angle switching. When the value of each bit is "0", the user's operation is permitted. When the value of the bit is "1", the user's operation is prohibited.

Accordingly, by referring to a bit value corresponding to the user's operation represented by the VOBU user's-operation control information, it is determined whether the switching of subpictures and audio is prohibited by the producer. However, in the case of the angle switching, when the corresponding bit of the VOBU user's-operation control information is "1", and a block being created is an angle block, it is determined that angle switching is prohibited.

The users-operation control is valid from the time designated by the VOBU presentation-start time to the time designated by the VOBU presentation-end time.

Figure 9:
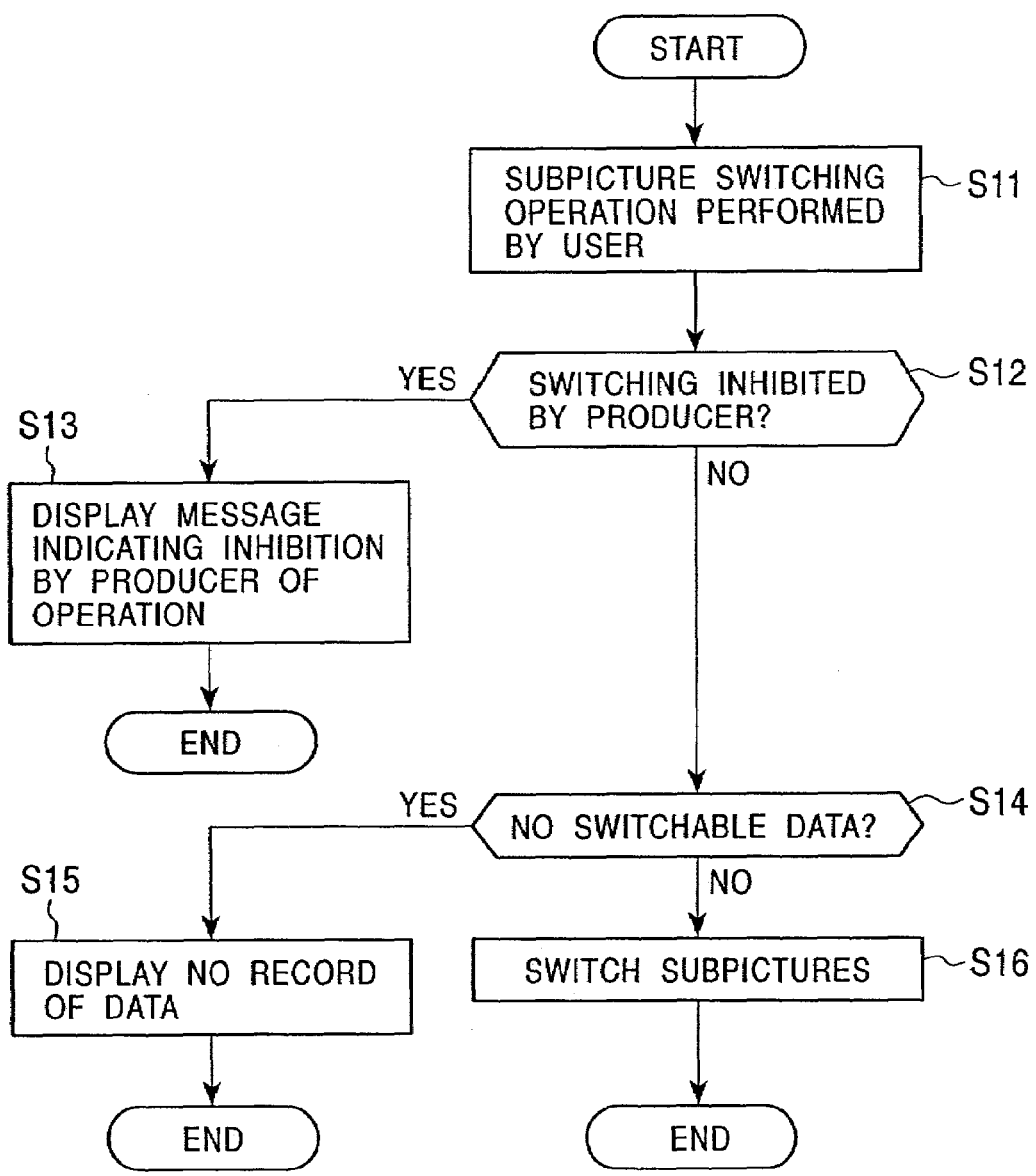
FIG. 9 is a flowchart showing a process of the DVD player according to the first embodiment when it switches subpictures.

The operation of the DVD player according to this embodiment is described below with reference to the flowchart shown in FIG. 9. The following case describes a process performed when switching subpictures.

When a subpicture switching operation is performed by the user in step S11, the process proceeds to step S12. In step S12, by referring to a bit value corresponding to the above operation of the PGC user's-operation control information in the program chain information or of the VOBU user's-operation control information in the presentation control information, the system controller 60 determines whether the user's requested operation is prohibited.

Figure 10:
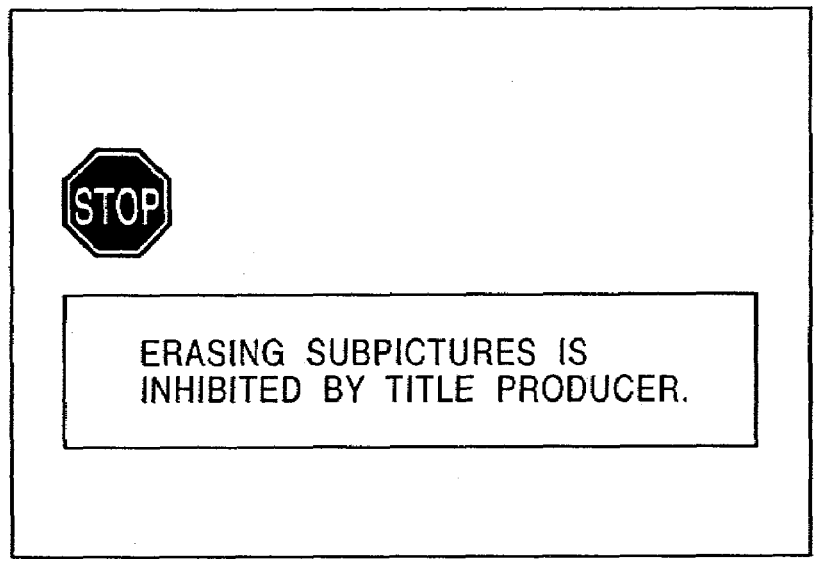
FIG. 10 is an illustration of a message displayed on a screen when a user's operation is prohibited by a title producer.

When the user's requested operation is prohibited, the process proceeds to step S13, and displays, for example, the message "ERASING SUBPICTURES IS PROHIBITED BY TITLE PRODUCER" on the screen, as shown in FIG. 10. Accordingly, the user can know that, although video data (main picture) and subpicture data (subpicture) are separately recorded on the DVD, switching of subpictures (switch of settings) is prohibited by the producer.

If it is determined in step S12 that the user's operation is not prohibited, the process proceeds to step S14. In step S14, by referring to the PGC subpicture-stream control table in the program-chain general information, it is determined whether the subpicture data is recorded.

Figure 11:
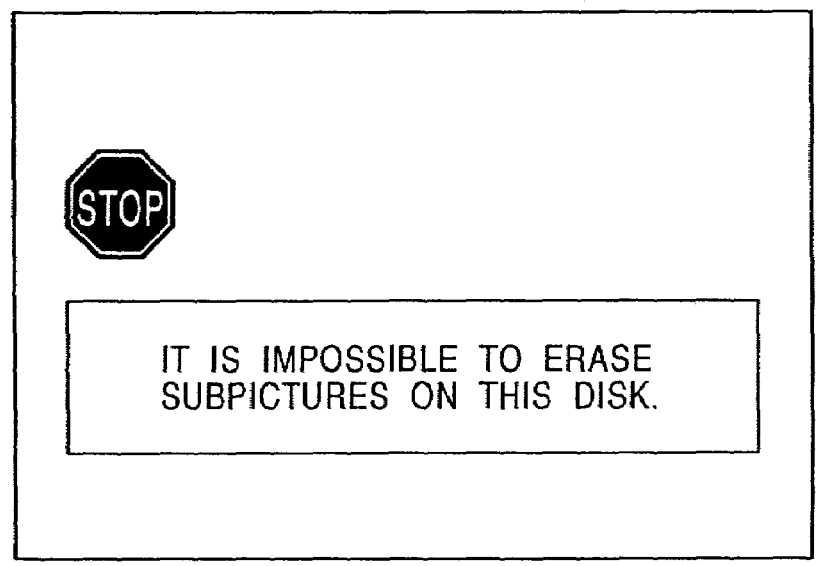
FIG. 11 is an illustration of a message displayed on a screen when data corresponding to a user's operation is not recorded.

If it is determined that the subpicture data has not been recorded, the process proceeds to step S15, and displays, for example, the message "IT IS IMPOSSIBLE TO ERASE SUBPICTURES ON THIS DISK" on the screen, as shown in FIG. 11. Accordingly, the user can know that the displayed subpicture is recorded as included in the video part and the subpicture data is not separately recorded on the DVD.

If it is determined in step S14 that the DVD has switchable subpicture data, the process proceeds to step S16, and switches the subpictures to another language in response to the user's requested operation, or displays no subpictures.

As described above, the DVD player according to this embodiment displays a message such as "ERASING SUBPICTURES IS PROHIBITED BY TITLE PRODUCER" (as shown in FIG. 6) on the screen when the user's requested operation is prohibited by the title producer, and it displays a message such as "IT IS IMPOSSIBLE TO ERASE SUBPICTURES ON THIS DISK" (as shown in FIG. 7) on the screen when the subpictures are recorded as included in the video part. This informs the user that the inability to erase the subpictures is due to the DVD and that the DVD player is not out of order. In this manner, according to the DVD player of this embodiment, when the user cannot switch settings, the reason for this inability is clarified. Thus, the user is prevented from having an anxiety that the DVD player is out of order when the DVD is the cause.

Although the above case has described a process performed when the user tries to erase the subpictures, the present invention is not limited to the above case. For example, in a case in which the user tries to switch angles or audio languages, when this type of setting switching is prohibited by the title producer, the present invention can display a message indicating that the operation is prohibited. When the DVD has no corresponding data, the present invention can display a message indicating that an operation is impossible due to the lack of corresponding data.

When the specifications of the DVD player prohibit settings from being switched, for example, a table (hereinafter referred to as an "prohibited operation table") of operations that are prohibited in the DVD player, the prohibited operation table is referred to when a user's requested operation is attempted. If the requested operation matches an item of the table, the DVD player displays, for example, a message such as "DEVICE SPECIFICATIONS PROHIBIT THE OPERATION".

Although the above embodiment uses one of the PGC user's-operation control information and the VOBU user's-operation control information to determine whether the subpicture data is detected, data on which the determination is based is not limited to this information.

Second Embodiment

A second embodiment of the present invention is described below. The second embodiment is also described with reference to the block diagram of the DVD player in FIG. 1. The second embodiment differs from the first embodiment in that the system controller 60 operates differently.

Figure 12:
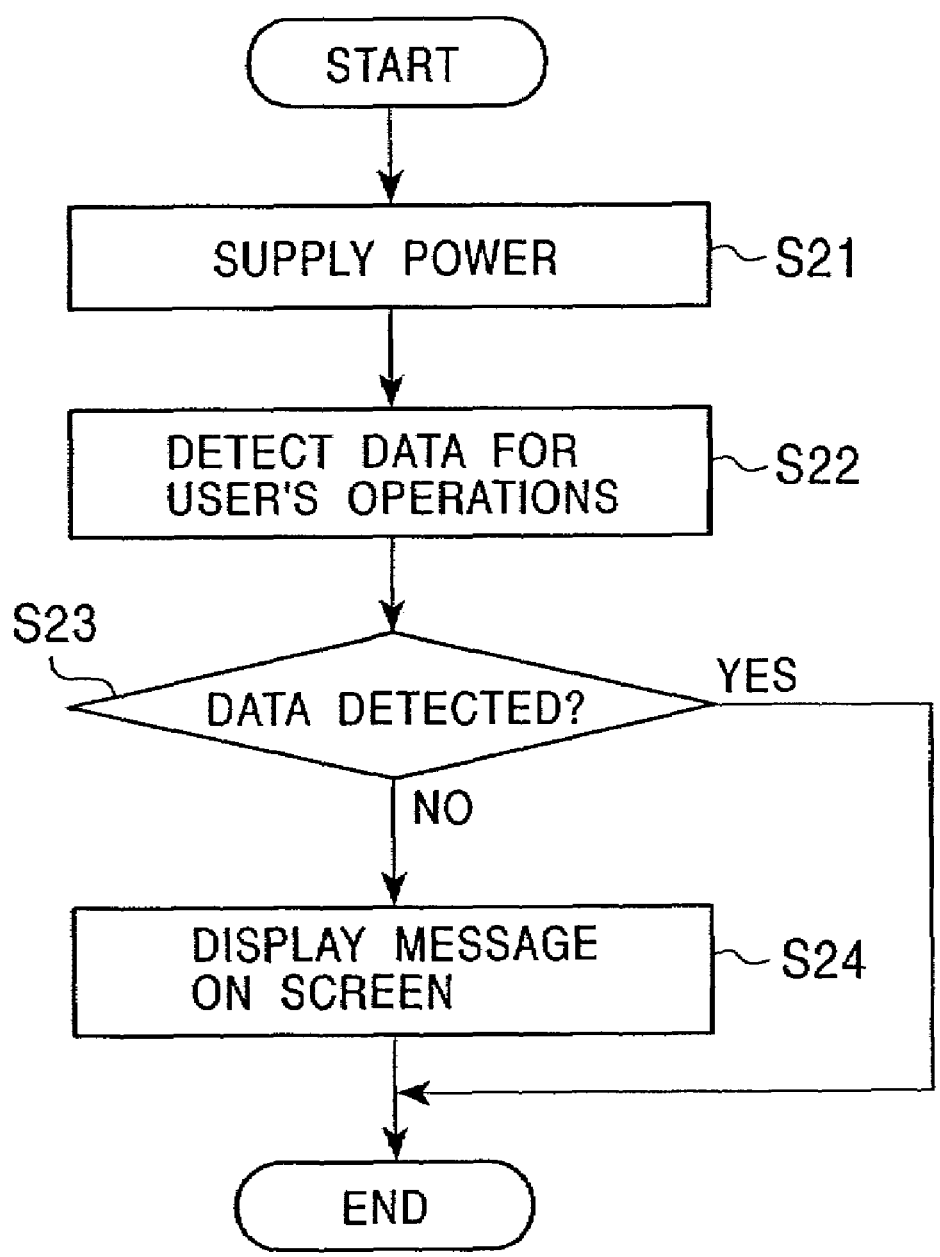
FIG. 12 is a flowchart showing a process of a system controller in a second embodiment of the present invention when power is supplied.

FIG. 12 is a flowchart showing the operation of the system controller 60 in the second embodiment when the DVD player is supplied with power. In the following description, the DVD has been loaded into the DVD player when it is supplied with power.

After power is supplied in step S21, the system controller 60 proceeds to step S22. In step S22, by referring to the PGC user's-operation control information, the PGC audio-stream control table, the PGC subpicture-stream control table, the VOBU user's-operation control information, the angle blocks, etc., the system controller 60 controls the servo controller 18 and the digital signal processor 24 to determine whether subpicture data, audio data to be switched, or video data for switching angles are recorded.

Figure 13:
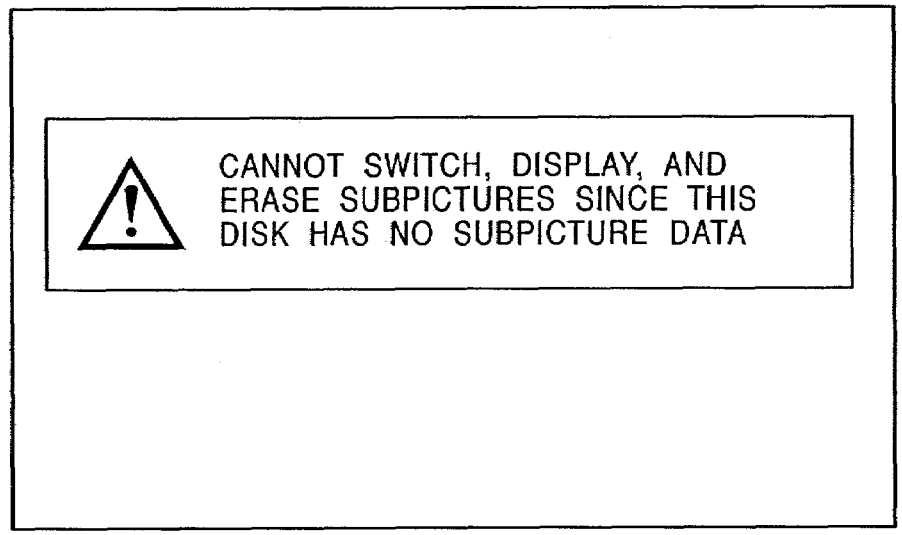
FIG. 13 is an illustration of a message displayed on a screen when subpicture data is not recorded on a DVD.

After determining in step S23 that the operation by the user of switching is impossible because the above data is not recorded, the system controller 60 proceeds to step S24, and displays on the display a message indicating that the switching operation is impossible since the DVD has no data for switching. For example, when the subpicture data is not recorded, a message indication is displayed that it is impossible to switch, display, and erase subpictures since the DVD has no subpicture information, as shown in FIG. 13. After that, the system controller 60 terminates power-supply processing before proceeding to a normal operation.

In addition, when data for switching by the user's operation is recorded, the system controller 60 terminates power-supply processing without displaying any message, and proceeds to the normal operation.

The above case determines whether all the types of data, that is, subpicture data, switching audio data, and video data for switching angles are recorded. However, by way of example, after determining whether the subpicture data is recorded when subpicture switching (or erasure) is requested, if the requested operation is impossible the system controller 60 may display on the display unit a message indicating this inability.

Also in the second embodiment, the user is prevented from having an anxiety that the DVD player is out of order even though the DVD is the cause, because the user can know whether any requested operation is impossible due to a lack of data.

In the second embodiment, a case in which power is supplied to the DVD player, with a DVD loaded into it beforehand, has been described. However, when the DVD is loaded into the DVD player, detection of whether data for switching by the user is recorded is performed, and when no data is recorded, a message indicating no data may be displayed on the display unit.

Third Embodiment

A third embodiment of the present invention is described below. The third embodiment is also described with reference to the block diagram of the DVD player in FIG. 1. The third embodiment differs from the first embodiment in that the system controller 60 operates differently.

When a DVD video is played back from the DVD, the system controller 60 controls the servo controller 18 and the digital signal processor 24 to determine whether subpicture data, audio data to be switched, and video data for switching angles are recorded by referring to the PGC user's-operation control information, the PGC audio-stream control table, the PGC subpicture-stream control table, the VOBU user's-operation control information, the angle blocks, etc.

Figure 14A:
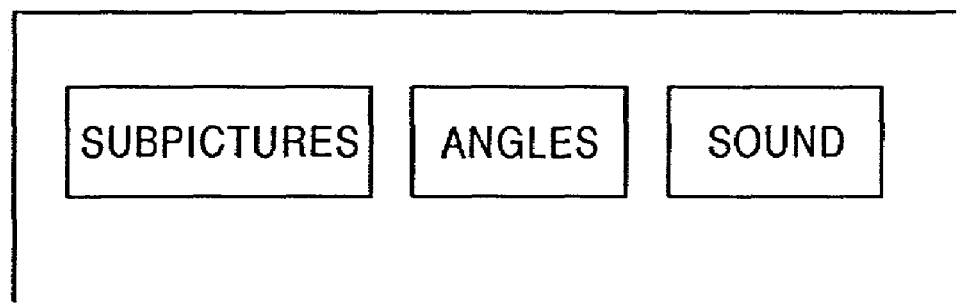
FIG. 14A is an illustration of a screen displayed when subpictures and audio can be switched in a third embodiment of the present invention.
Figure 14B:
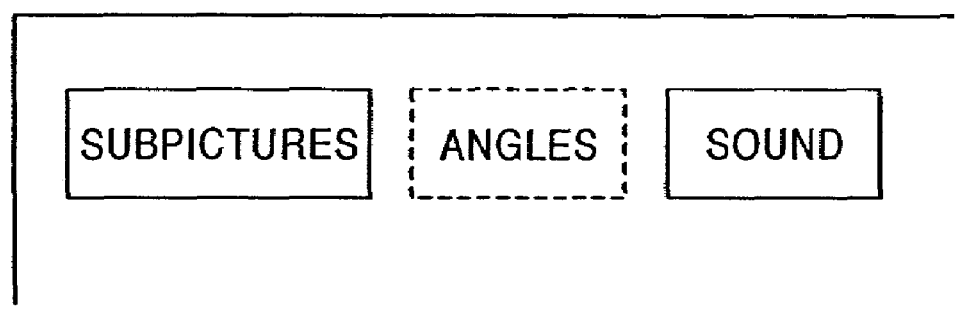
FIG. 14B is an illustration of a screen displayed when angle switching is impossible in the third embodiment since data for angle switching is not recorded.

After that, the system controller 60 initiates playing back the DVD, and displays operation indicators (operation items) in a corner of the screen, as shown in FIGS. 14A and 14B. FIG. 14A shows that the operation of switching subpictures, angles, and audio is possible. FIG. 14B shows the inability to perform the angle switching operation by displaying the angle indicator in light gray (indicated by the broken line in FIG. 14B).

In addition, the system controller 60 may display the indicators only when initiating playing back the DVD or when the user performs a predetermined operation.

Also in the third embodiment, the user can know whether any requested operation is impossible due to a lack of data. Accordingly, the user is prevented from having an anxiety that the DVD player is out of order even though the DVD is the cause.

What is claimed is:

1. A digital versatile disk player for playing back content recorded on a digital versatile disk, said digital versatile disk player comprising a controller which determines whether or not predetermined data for enabling a switching operation by a user is recorded on said digital versatile disk when said digital versatile disk begins playback, and simultaneously displays, on a display unit for said digital versatile disk player, both a type of switching operation which is executable by said user and a type of switching operation which is not executable by said user based on the determination of whether or not predetermined data for enabling a switching operation is recorded, wherein the type of operation which is not executable by said user is displayed in a different form than the type of operation which is executable by said user.

2. A digital versatile disk player according to claim 1, wherein the predetermined data is one of subpicture switching data, audio switching data, and angle switching data.

3. A digital versatile disk player for playing back content recorded on a digital versatile disk, said digital versatile disk player comprising:
  a key for displaying a plurality of operation indicators, including a type of switching operation which is executable by a user and a type of switching operation which is not executable by said user; and
  a controller for simultaneously displaying both the executable type of switching operation and the non-executable type of switching operation after, when a user uses the key to perform an operation, determining whether or not predetermined data for enabling a switching operation by said user is recorded on said digital versatile disk;
  wherein the type of operation which is not executable by said user is displayed in a different form than the type of operation which is executable by said user.

4. A digital versatile disk player according to claim 3, wherein the predetermined data is one of subpicture switching data, audio switching data, and angle switching data.

5. A digital-versatile-disk playback method for playing back content recorded on a digital versatile disk, said digital-versatile-disk playback method comprising:
   when said digital versatile disk begins playback, determining whether or not predetermined data for enabling a switching operation by a user is recorded on said digital versatile disk; and
   simultaneously displaying both a type of switching operation which is executable by a user and a type of switching operation which is not executable by said user based on the determination of whether or not predetermined data for enabling a switching operation is recorded, wherein the type of operation which is not executable by said user is displayed in a different form than the type of operation which is executable by said user.

6. A digital-versatile-disk playback method according to claim 5, wherein the predetermined data is one of subpicture switching data, audio switching data, and angle switching data.

7. A digital-versatile-disk playback method for playing back content recorded on a digital versatile disk, said digital-versatile-disk playback method comprising:
   when a predetermined key for displaying a plurality of operation indicators including a type of switching operation which is executable by a user and a type of switching operation which is not executable by said user is operated by said user, determining whether or not predetermined data for enabling a switching operation requested by said user is recorded on said digital versatile disk; and
   simultaneously displaying both an executable type of switching operation and a non-executable type of switching operation based on said determination;
   wherein the type of operation which is not executable by said user is displayed in a different form than the type of operation which is executable by said user.

8. A digital-versatile-disk playback method according to claim 7, wherein the predetermined data is one of subpicture switching data, audio switching data, and angle switching data.

* * * * *